(12) United States Patent
Forster

(10) Patent No.: US 7,247,117 B2
(45) Date of Patent: Jul. 24, 2007

(54) DRIVE AXLE WITH A WORK DRIVE THAT CAN BE DRIVEN BY THE ELECTRIC MOTOR OF A TRACTION DRIVE

(75) Inventor: Franz Forster, Karlstadt-Mühlheim (DE)

(73) Assignee: Linde Aktiengesellschaft, Wiesbaden (DE)

(*) Notice: Subject to any disclaimer, the term of this patent is extended or adjusted under 35 U.S.C. 154(b) by 160 days.

(21) Appl. No.: 11/137,714

(22) Filed: May 25, 2005

(65) Prior Publication Data
US 2005/0282676 A1 Dec. 22, 2005

(30) Foreign Application Priority Data
May 27, 2004 (DE) ............... 10 2004 026 039

(51) Int. Cl.
*F16H 48/06* (2006.01)
(52) U.S. Cl. .............................. 475/221; 180/65.6
(58) Field of Classification Search ............... 475/149, 475/150, 151, 204, 206, 221, 198, 84, 136; 47/198; 180/65.6, 65.2
See application file for complete search history.

(56) References Cited

U.S. PATENT DOCUMENTS

| 4,418,777 | A | * | 12/1983 | Stockton ................ 180/65.6 |
| 5,052,990 | A | * | 10/1991 | Sakakibara et al. ......... 475/210 |
| 5,372,213 | A | * | 12/1994 | Hasebe et al. ............. 180/65.6 |
| 5,396,968 | A | * | 3/1995 | Hasebe et al. ............. 180/65.6 |
| 5,419,406 | A | * | 5/1995 | Kawamoto et al. ........ 180/65.6 |
| 5,845,732 | A | * | 12/1998 | Taniguchi et al. ......... 180/65.6 |
| 5,919,109 | A | * | 7/1999 | Fleckenstein ............... 475/151 |
| 2005/0115750 | A1 | * | 6/2005 | Takami et al. ............. 180/65.2 |

FOREIGN PATENT DOCUMENTS

DE 102 11 193 A1 9/2003

\* cited by examiner

Primary Examiner—Charles A. Marmor
Assistant Examiner—Justin K. Holmes
(74) Attorney, Agent, or Firm—The Webb Law Firm

(57) ABSTRACT

A drive axle, in particular an industrial truck drive axle, has an electric motor (2), a differential (4) of a traction drive, which differential is oriented coaxially with the electric motor, and a planetary gear set (3) that is connected between the electric motor (2) and the differential (4). To reduce the effort and expense required to construct the drive axle, the electric motor (2) can be connected in a drive connection by means of a coupling device (5) that is in an operative connection with the planetary gear set (3), with the traction drive, and/or with a work drive. The electric motor (2) can thereby feed a work drive alternatively or in addition to the traction drive.

15 Claims, 2 Drawing Sheets

DRIVE AXLE WITH A WORK DRIVE THAT CAN BE DRIVEN BY THE ELECTRIC MOTOR OF A TRACTION DRIVE

CROSS-REFERENCE TO RELATED APPLICATION

This application claims priority to German Application No. 10 2004 026 039.7 filed May 27, 2004, which is herein incorporated by reference in its entirety.

BACKGROUND OF THE INVENTION

1. Field of the Invention

This invention relates to a drive axle, in particular the drive axle of an industrial truck, with an electric motor, a differential of a traction drive oriented coaxially with the electric motor, and a reduction gear that is connected between the electric motor and the differential.

2. Technical Considerations

DE 102 11 193 A1 describes a drive axle in which, inside a common axle housing, there are a first electric motor for a traction drive and a second electric motor for a hydraulic pump of a work drive. In two of the three exemplary embodiments described in the above-referenced document, downstream of the electric motor of the traction drive are a planetary gear set and a differential. To create the space inside the axle housing required for the second electric motor, there is a bypass gear set connected to the differential. The bypass gear set has two spur gear stages that are at some axial distance from each other, and between which the second electric motor is located, oriented at a right angle to the first electric motor.

The drive axle described in the known reference is preferably provided for use in fork lift trucks. In this case, the second electric motor and the hydraulic pump of the work drive driven by it generate the lifting and tilting movements of a load lifting device.

It is an object of this invention to provide a drive axle of the general type described above but that is easier and more economical to construct.

SUMMARY OF THE INVENTION

The invention provides a drive axle in which the electric motor can be brought into a drive connection by means of a coupling device that is in an operative connection with the planetary gear set, with the differential of the traction drive, and/or with a work drive.

A teaching of the invention is, accordingly, that the electric motor that is present in the drive axle of the traction drive, which in the known art is provided in the form of a traction motor, can also be used for the drive of drive functions by means of an engagement in the downstream planetary gear set. This teaching is based on the knowledge that in an industrial truck in the form of a fork lift truck, operating conditions are very frequently encountered in which the truck is using only its traction drive system (in which the load lifting device remains unactuated) or in which only the load lifting device is actuated while the vehicle is standing still. In other words, the fork lift truck is theoretically either in traction operation or in lifting operation.

With the drive axle of the invention, the work drive does not require its own motor. Instead, the motor of the traction drive can be used to feed power into the work drive. On fork lift trucks it is thereby advantageous if the power requirement of the work drive is on the same order of magnitude as the power requirement of the traction drive.

If the coupling device is in an operative connection with a component that controls or regulates the torque that can be transmitted, it is possible to also cover ranges of combined operation (transitional situations), in which, for example, the primary operation is the lifting of the load, and the truck is traveling only at a slow speed (creep speed) or, vice versa, when the truck is being driven primarily at high speed and the load is being lifted at a low lifting speed while the truck is still in motion, i.e., shortly before the truck comes to a stop. During combined operation, therefore, the electric motor feeds power both into the differential of the traction drive and into the work drive. The power is, therefore, divided (torque division or splitting).

For this purpose, the coupling device is advantageously frictionally engaged. Combined traction and lifting operation is thereby made possible by controlled or regulated slip in the coupling device. For this purpose, the coupling device can have friction linings or can be in the form of a viscous or fluid coupling.

If the work drive has hydraulic consumers (hydraulic work systems), during operating conditions in which the electric motor drives only the differential (traction operation) or during which combined operation is being carried out, this hydraulic work system can be driven alternatively or additionally by a hydraulic pump of a steering drive. Under some conditions, it is therefore possible, for combined operation, to do without a device for the open-loop or closed-loop control of the torque that can be transmitted by the coupling device. When the electric motor is coupled with the differential of the traction drive, it is nevertheless possible to operate the hydraulic work system (to a limited extent). In combined operation, the energy for (relatively small) movements of the hydraulic work system is thereby supplied from the steering pump.

In one development of the invention, the planetary gear set has an input-side sun wheel that is connected with a drive shaft of the electric motor, a ring gear and, located radially between them, planet wheels that are mounted on a planet carrier and engaged with the sun wheel and an internal toothing of the ring gear. The planet carrier can be coupled directly or indirectly to the differential, whereby the ring gear can be fixed in position and released by the coupling device relative to a component that is permanently attached to the housing and, in the released or partly released state, is in an operative connection with the work drive.

When the ring gear is stationary with respect to the component that is attached to the housing, the differential and thus the wheels that are located on the axle ends are driven, whereby the speed of the electric motor is reduced by the reduction gear (traction operation). If the ring gear is released, the rotating drive shaft of the electric motor moves the ring gear in a rotational motion which is transferred by suitable means to the work drive (lifting operation).

In one embodiment of the invention, the traction drive is provided with at least one brake so that when the ring gear is released, the power generated by the electric motor can be defined and fed in its entirety into the work drive. When the brakes are closed, the power flux then occurs exclusively from the electric motor to the work drive. At the same time, this solution prevents the vehicle that is equipped with the drive axle of the invention from moving unintentionally.

In one development of the invention, the ring gear is provided with external toothing, which is engaged with a gear wheel of a hydraulic pump. With extremely simple means, an effective connection is thereby created between the ring gear of the planetary gear set and the work drive.

In one realization of the invention, the differential is in the form of a bevel gear differential. In this case, the planet carrier is connected so that it drives the differential cage or is molded in one piece on it. Basically, it is also possible to use a planetary differential.

It is further advantageous if the coupling device can be pressurized by spring force in the closing direction and hydraulically in the opening direction. In the starting position, therefore, the ring gear is always coupled with the component that is fixed to the housing so that the electric motor drives the differential.

In one development of the invention, the planetary gear set can be in two stages. The reduction gears that are present in many applications in the vicinity of the axle ends, and the brake(s) of the traction drive is/are low-loss, because it/they work at a low speed.

The ring gear of the first stage of the planetary gear set is advantageously connected with the coupling device and the planet carrier of the second stage is coupled with the differential.

BRIEF DESCRIPTION OF THE DRAWINGS

Additional advantages and details of the invention are explained in greater detail below with reference to the exemplary embodiment that is illustrated in the accompanying schematic figures, in which like reference numbers identify like parts throughout.

DESCRIPTION OF THE PREFERRED EMBODIMENTS

Figure 1:
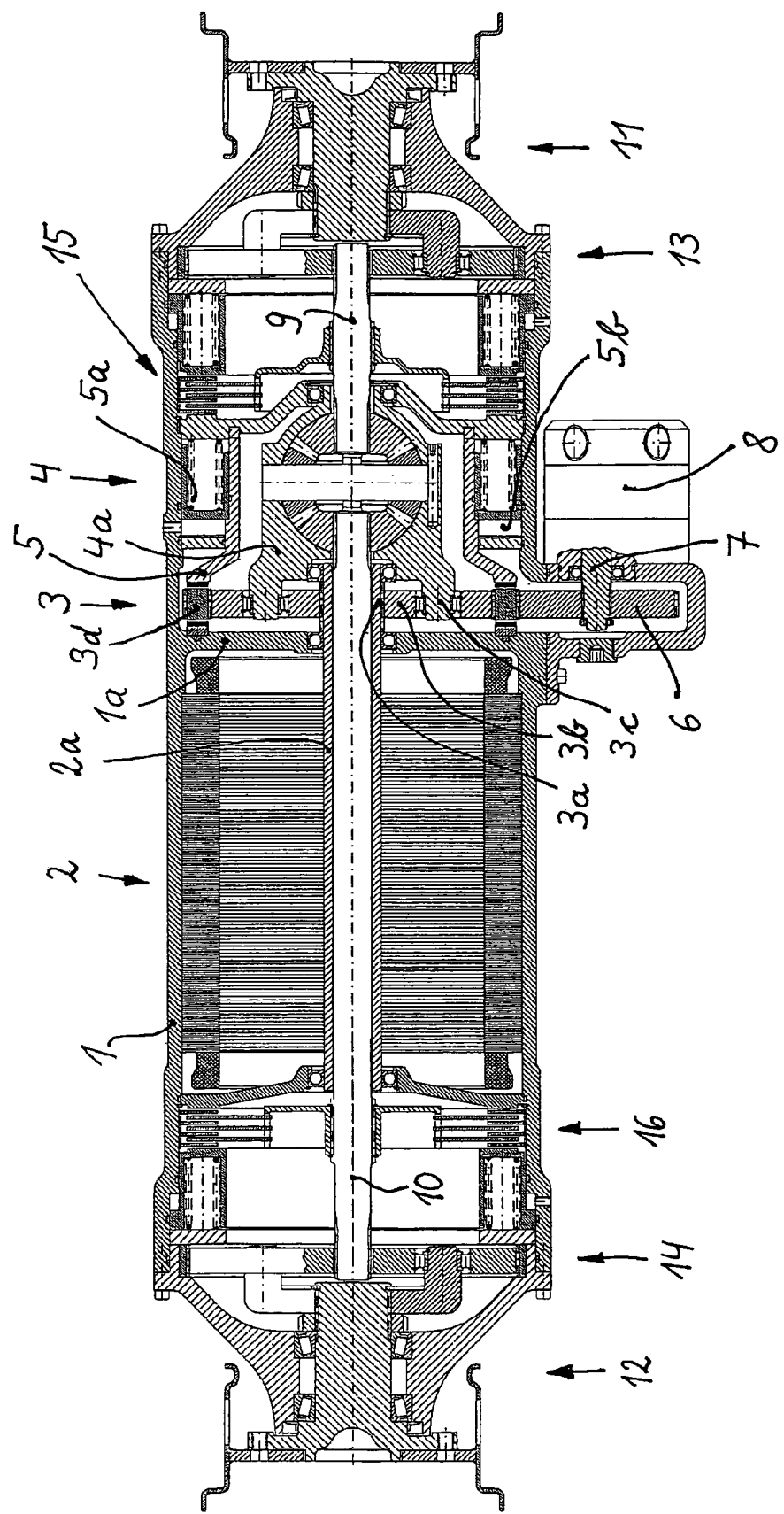
FIG. 1 is a side, sectional view of a drive axle of the invention.

The drive axle, which in the illustrated exemplary embodiment is provided for use in an industrial truck in the form of a fork lift truck, has an axle housing 1 in which there is an electric motor 2. A hollow drive shaft 2a of the electric motor 2 drives a differential 4 with the interposition of a planetary gear set 3. For this purpose, on the end of the drive shaft 2a next to the planetary gear set 3, a sun wheel 3a is molded, which is engaged with planet wheels 3b, which are mounted on a planet carrier 3c. The planet wheels 3b are also engaged with the internal toothing of a ring gear 3d of the planetary gear set 3.

In the variant embodiment illustrated in FIG. 1, the planet carrier 3c is molded onto a differential cage 4a of the differential 4, which in the illustrated exemplary embodiment is in the form of a bevel gear differential. The differential cage 4a is, therefore, the input element of the differential 4.

The ring gear 3d of the planetary gear set 3 can be fastened by a coupling device 5 to a partition 1a of the axle housing 1. In the broad practice of the invention, the coupling device 5 can be, but is not limited to, a mechanical linkage or an electromagnetic device, for example. In the illustrated embodiment, the coupling device 5 is biased in the closing direction by a spring force (springs 5a). A hydraulic pressure in the opening direction is present in an annulus 5b. On the outside of the ring gear 3d, an external toothing is molded, which is engaged with a gear wheel 6 fastened to a pump shaft 7 of a hydraulic pump 8 that is flange-mounted on the axle housing 1 and is part of a work drive (hydraulic work system).

From the differential 4, respective output shafts 9 and 10 extend to the axle ends of the drive axle. The left output shaft 10 in FIG. 1 extends through the hollow drive shaft 2a of the traction motor 2. On each axle end there are respective wheel bearings 11 and 12 and respective reduction gears 13 and 14, which can be preferably also realized in the form of planetary gear sets. Both drive shafts 9 and 10 can be fastened with respect to the axle housing 1 by respective brakes 15 and 16, which can be in the form of spring-loaded multiple-disc brakes.

To release the brakes 15, 16 and the coupling device 5, a separate hydraulic pump (not shown in the figures) is provided in the fork lift truck, with which the steering system, for example, can also be supplied.

The operation of the drive axle taught by the invention is described below.

In the starting condition, there is no or only relatively little hydraulic pressure in the annulus 5b of the coupling device 5, so that the action of the spring 5a closes the coupling device 5 and, thus, the ring gear 3d of the planetary gear set 3 is fixed in position relative to the partition 1a and, thus, relative to the axle housing 1. When the brakes 15 and 16 are released, the drive shaft 2a of the electric motor 2 can, therefore, rotate. The rotational movement of the drive shaft 2a is transmitted at a reduced speed (planetary gear set 3) via the driven planet carrier 3c of the planetary gear set 3 to the differential 4 and from there via the output shafts 9 and 10 to the axle ends. A further speed reduction can be achieved by wheel-side reduction gears 13 and 14. The sequence of movements described above represents the traction operation of the fork lift truck equipped with the drive axle of the invention.

The coupling device 5 can be released by a sufficiently high pressure in the annulus 5b. The brakes 15 and 16 of the traction drive are thereby advantageously closed. When the coupling device 5 is released and the brakes 15 and 16 are closed, the rotational movement of the drive shaft 2a of the electric motor 2 is, therefore, converted into a rotational movement of the ring gear 3d of the planetary gear set 3, while the planet carrier 3c is blocked. As a result of the coupling of the external toothing of the ring gear 3d with the gear wheel 6 of the hydraulic pump 8 of the hydraulic work system, the power of the electric motor 2 is thereby fed into the work drive and can be used to raise and/or tilt a load lifting device.

To also make combined operation possible, the torque that can be transmitted by the coupling device 5 and/or the brakes 15 and 16 can be controlled by a component (not shown in the figures and preferably electronic). In that case, of course, losses occur, although when such combination operation represents a relatively low fraction of the total operation, these losses can be tolerated and have only an insignificant effect on the overall efficiency.

It is also possible to achieve combined operation in another way. For example, the hydraulic work system can also be fed by the above-mentioned separate hydraulic pump (for the steering system and the release of the brakes 15, 16 and of the coupling device 5). In that case, a (limited) use of the hydraulic work system is also possible during traction operation of the drive axle.

Figure 2:
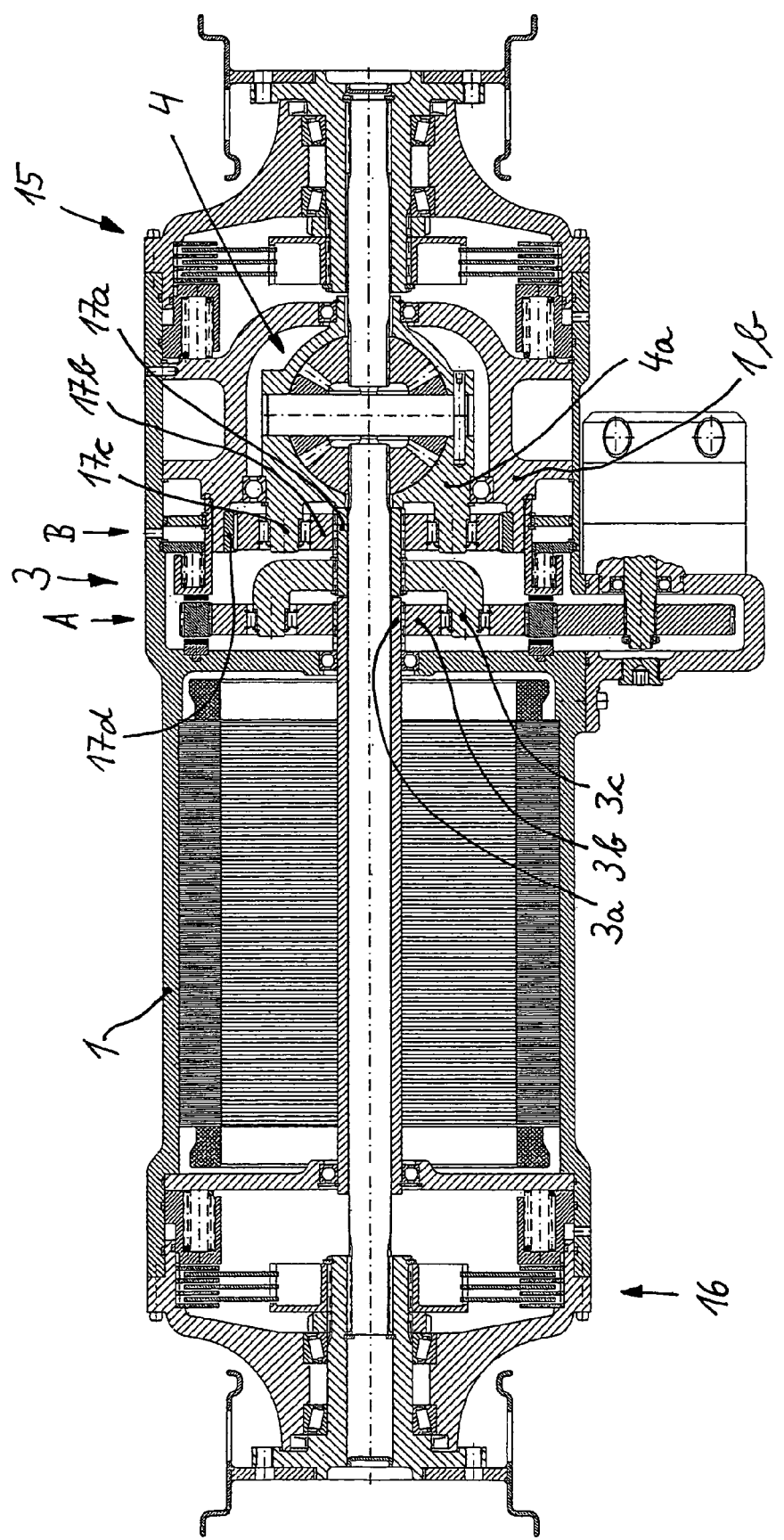
FIG. 2 is a side, sectional view of a variant of the drive axle illustrated in FIG. 1.

In the exemplary embodiment illustrated in FIG. 2, the planetary gear set 3 is configured in two stages. In this case, a first stage A corresponds to the planetary gear set 3 that is illustrated in FIG. 1. The planet carrier 3c, however, is not connected directly with the differential cage 4a of the differential 4 but drives a sun wheel 17*a* of a second stage B. Planet wheels 17*b* that are in engagement with the sun wheel 17*a* are mounted on a planet carrier 17*c*, which is molded onto the differential cage 4*a* of the differential 4. A ring gear 17*d* of the second stage B of the planetary gear set 3 is fastened to a transverse wall 1*b*, which is connected with the axle housing 1.

As a result of the presence of the two-stage planetary gear set, the two reduction gears 13 and 14 located on the axle ends can be eliminated. The brakes 15 and 16 then run slowly, which reduces losses.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A drive axle, comprising:
   an axle housing;
   an electric motor;
   a differential of a traction drive, which differential is oriented coaxially with respect to said electric motor; and
   a planetary gear set connected between the electric motor and the differential,
   wherein the electric motor is connected to the differential of the traction drive and/or with a work drive by a coupling device that is in an operative connection with the planetary gear set,
   wherein the traction drive includes at least one brake, and
   wherein the planetary gear set comprises a ring gear provided with external toothing, which is engaged with a gear wheel of a hydraulic pump.

2. The drive axle as claimed in claim 1, wherein the differential is a bevel wheel differential.

3. The drive axle as claimed in claim 1, wherein the planetary gear set has an input-side sun wheel that is connected with a drive shaft of the electric motor, the ring gear and planet wheels located radially between them, mounted on a planet carrier and in engagement with the sun wheel and an internal toothing of the ring gear, wherein the planet carrier is coupled directly or indirectly with the differential, and wherein the ring gear can be fastened or released by the coupling device relative to a component which is fixed to the housing, and in the released or partly released position is in an operative connection with the work drive.

4. A drive axle, comprising:
   an axle housing;
   an electric motor;
   a differential of a traction drive, which differential is oriented coaxially with respect to said electric motor; and
   a planetary gear set connected between the electric motor and the differential,
   wherein the electric motor is connected to the differential of the traction drive and/or with a work drive by a coupling device that is in an operative connection with the planetary gear sets,
   wherein the planetary gear set has an input-side sun wheel that is connected with a drive shaft of the electric motor, a ring gear and planet wheels located radially between them, mounted on a planet carrier and in engagement with the sun wheel and an internal toothing of the ring gear, wherein the planet carrier is coupled directly or indirectly with the differential, and wherein the ring gear is fastened or released by the coupling device relative to a component which is fixed to the housing and in the released or partly released position is in an operative connection with the work drive, and
   wherein the ring gear is provided with external toothing which is engaged with a gear wheel of a hydraulic pump.

5. The drive axle as claimed in claim 4, wherein the coupling device is frictionally engaged.

6. The drive axle as claimed in claim 4, wherein the work drive has hydraulic consumers.

7. The drive axle as claimed in claim 4, wherein the component is a partition.

8. The drive axle as claimed in claim 4, wherein the traction drive includes at least one brake.

9. The drive axle as claimed in claim 4, wherein the differential is a bevel wheel differential.

10. The drive axle as claimed in claim 4, wherein the coupling device is in an operative connection with a component that controls or regulates a transmissible torque.

11. The drive axle as claimed in claim 10, wherein the coupling device is frictionally engaged.

12. The drive axle as claimed in claim 4, wherein the coupling device can be pressurized by spring force in a closing direction and by hydraulic force in an opening direction.

13. The drive axle as claimed in claim 12, wherein the hydraulic force is supplied via an annulus.

14. The drive axle as claimed in claim 4, wherein the planetary gear set includes two stages.

15. The drive axle as claimed in claim 14, wherein a ring gear of a first stage of the planetary gear set is in an operative connection with the coupling device and a planet carrier of the second stage is coupled with the differential.

* * * * *

UNITED STATES PATENT AND TRADEMARK OFFICE
CERTIFICATE OF CORRECTION

PATENT NO. : 7,247,117 B2  
APPLICATION NO. : 11/137714  
DATED : July 24, 2007  
INVENTOR(S) : Forster Page 1 of 1

It is certified that error appears in the above-identified patent and that said Letters Patent is hereby corrected as shown below:

Column 6, line 9, Claim 4, "planetary gear sets," should read -- planetary gear set, --

Signed and Sealed this

Fourth Day of December, 2007

JON W. DUDAS  
*Director of the United States Patent and Trademark Office*